United States Patent
Fowe

(10) Patent No.: US 11,915,583 B2
(45) Date of Patent: Feb. 27, 2024

(54) TRAFFIC PREDICTIONS AT LANE LEVEL

(71) Applicant: HERE Global B.V.

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 784 days.

(21) Appl. No.: 16/272,726

(22) Filed: Feb. 11, 2019

(65) Prior Publication Data
US 2020/0258381 A1 Aug. 13, 2020

(51) Int. Cl.
G08G 1/01 (2006.01)
G06N 5/046 (2023.01)
G08G 1/052 (2006.01)

(52) U.S. Cl.
CPC .......... *G08G 1/0133* (2013.01); *G06N 5/046* (2013.01); *G08G 1/012* (2013.01); *G08G 1/0129* (2013.01); *G08G 1/052* (2013.01)

(58) Field of Classification Search
CPC .... G08G 1/0133; G08G 1/0129; G08G 1/052; G08G 1/012; G08G 1/0112; G06N 5/046; G06N 5/003; G06N 7/005
USPC ....................................................... 701/117
See application file for complete search history.

(56) References Cited

U.S. PATENT DOCUMENTS

| | | | |
|---|---|---|---|
| 7,813,870 B2 * | 10/2010 | Downs | G08G 1/0104 701/117 |
| 9,208,682 B2 | 12/2015 | Fowe | |
| 9,536,424 B2 | 1/2017 | MacFarlane et al. | |
| 2018/0033296 A1 | 2/2018 | Fowe | |

FOREIGN PATENT DOCUMENTS

CN 104809879 A 7/2015

OTHER PUBLICATIONS

Zhu, Zheng, et al. "Short-term traffic flow prediction with linear conditional Gaussian Bayesian network." Journal of Advanced Transportation 50.6. Oct. 6, 2016. pp. 1111-1123.

* cited by examiner

*Primary Examiner* — Maceeh Anwari
(74) *Attorney, Agent, or Firm* — Lempia Summerfield Katz LLC

(57) ABSTRACT

An apparatus and method for determining a traffic level in the future. A road network including graph edges for a plurality of intersections and graph nodes for a plurality of road links is identified. A road link of interest is selected from the plurality of road links. A set of related link subset are calculated for the selected road link. Historical data is queried for the related link subset. A predicted traffic level is calculated for the selected road link in response to the historical data for the related link subset.

19 Claims, 12 Drawing Sheets

TRAFFIC PREDICTIONS AT LANE LEVEL

FIELD

The following disclosure relates to traffic predictions, and more specifically, to traffic predictions at a lane level based on related road sections selected from a probabilistic graphic model.

BACKGROUND

Traffic reporting is the study of movement of vehicles on the roads. Analytical techniques may manage and track traffic information and derive travel times, guide driving behavior and optimize road infrastructure for cities. Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

Traffic services typically provide a speed or a range of speeds (e.g., low, medium, high) for a particular road. Another characteristic, traffic volume measures the total throughput of traffic for a particular road over a given span of time. Predictions for traffic may be made in response to traffic volume measurements. However, traffic volume is costly to measure. Traffic volume could be measured using sensors that detect every car passing a particular point on the road. The sensors could be any combination of inductive loops embedded in the roadway, radar, or cameras. These sensors can be expensive to install and maintain, and their availability varies from location to location.

SUMMARY

In one embodiment, a method for predicting future traffic for a roadway includes receiving road network data in a first road network format describing a road network including a plurality of road links and a plurality of intersections, wherein the first road network format includes graph edges for the plurality of road links and graph nodes for the plurality of intersections, converting the road network data to a second road network format describing the road network, wherein the second road network format includes graph edges for the plurality of intersections and graph nodes for the plurality of road links, selecting a road link from the plurality of road links, calculating a related link subset from the plurality of road links for the selected road link, querying historical data for the related link subset, and calculating a predicted traffic level for the selected road link in response to the historical data for the related link subset.

In another embodiment an apparatus for predicting future traffic for a roadway includes a road network module, a road link selection module, and a traffic level prediction module. The road network module is configured to convert road network data in a first road network format describing a road network including a plurality of road links and a plurality of intersections to a second road network format describing the road network, wherein the first road network format includes graph edges for the plurality of road links and graph nodes for the plurality of intersections, and the second road network format includes graph edges for the plurality of intersections and graph nodes for the plurality of road links. The road link selection module is configured to select a road link from the plurality of road links and calculate a related link subset from the plurality of road links for the selected road link. The traffic level prediction module is configured to query historical data for the related link subset and determine a traffic level prediction for the selected road link in response to the historical data for the related link subset.

In another embodiment, a non-transitory computer readable medium including instructions that when executed by a processor are configured to perform identifying road network data including graph edges for a plurality of intersections and graph nodes for a plurality of road links, selecting a road link from the plurality of road links, calculating a related link subset from the plurality of road links for the selected road link, querying historical data for the related link subset, and calculating a predicted traffic level for the selected road link in response to the historical data for the related link subset.

BRIEF DESCRIPTION OF THE DRAWINGS

Exemplary embodiments of the present invention are described herein with reference to the following drawings.

DETAILED DESCRIPTION

Real-time traffic prediction has been achieved by many traffic service providers (TSPs). However, the method of short-term traffic prediction remains a big challenge. Most TSPs use historical traffic pattern (TP) and report this as the predicted traffic; however, this method falls short when unusual traffic events happen on the road that deviates from the historical patterns. Hence, it is important to have a robust model and algorithm that can perform short-term traffic prediction based on dynamically changing traffic conditions. While solutions to this short-term traffic prediction problem have been presented, most of them require real time traffic volume information, which is rarely available at any significant scale or coverage area. The following embodiments solve the short-term traffic prediction problem using global navigation satellite system (GNSS) probe speeds only as sensor data and performs the prediction at lane-level giving more accurate traffic estimates and spatial granularity than any existing solutions.

Moreover, current traffic-aware navigation systems are sub-optimal in that they use only current time (time=t) traffic information for the fastest route selection. However, the traffic condition on the roads downstream could have changed before the vehicle gets there in the future (time=t+ x). The following embodiments determine a cost due to traffic speed that should be used for a road link that is, e.g., x minutes, downstream of the current position. The current position may be a position of a driver enroute to a destination. Instead of using the current traffic speed at time t for the computation, the future traffic speed at time t+x when the driver will traverse these road links should be used for the computation. The following embodiments perform a short-term traffic prediction algorithm in order to calculate or predict what the traffic at lane-level will be in the future. Accordingly, navigation systems or driving systems can use the traffic speed that is or closer to the actual speed when the driver traverses the route.

The following embodiments relate to several technological fields including but not limited to navigation, autonomous driving, assisted driving, traffic applications, and other location-based systems. The following embodiments achieve advantages in each of these technologies because an increase in the accuracy of traffic predictions improves the effectiveness, efficiency, and speed of specific application in these technologies. In each of the technologies of navigation, autonomous driving, assisted driving, traffic applications, and other location-based systems, improved traffic preventions improves the technical performance of the application. In addition, users of navigation, autonomous driving, assisted driving, traffic applications, and other location-based systems are more willing to adopt these systems given the technological advances in lane level traffic prediction.

Figure 1:
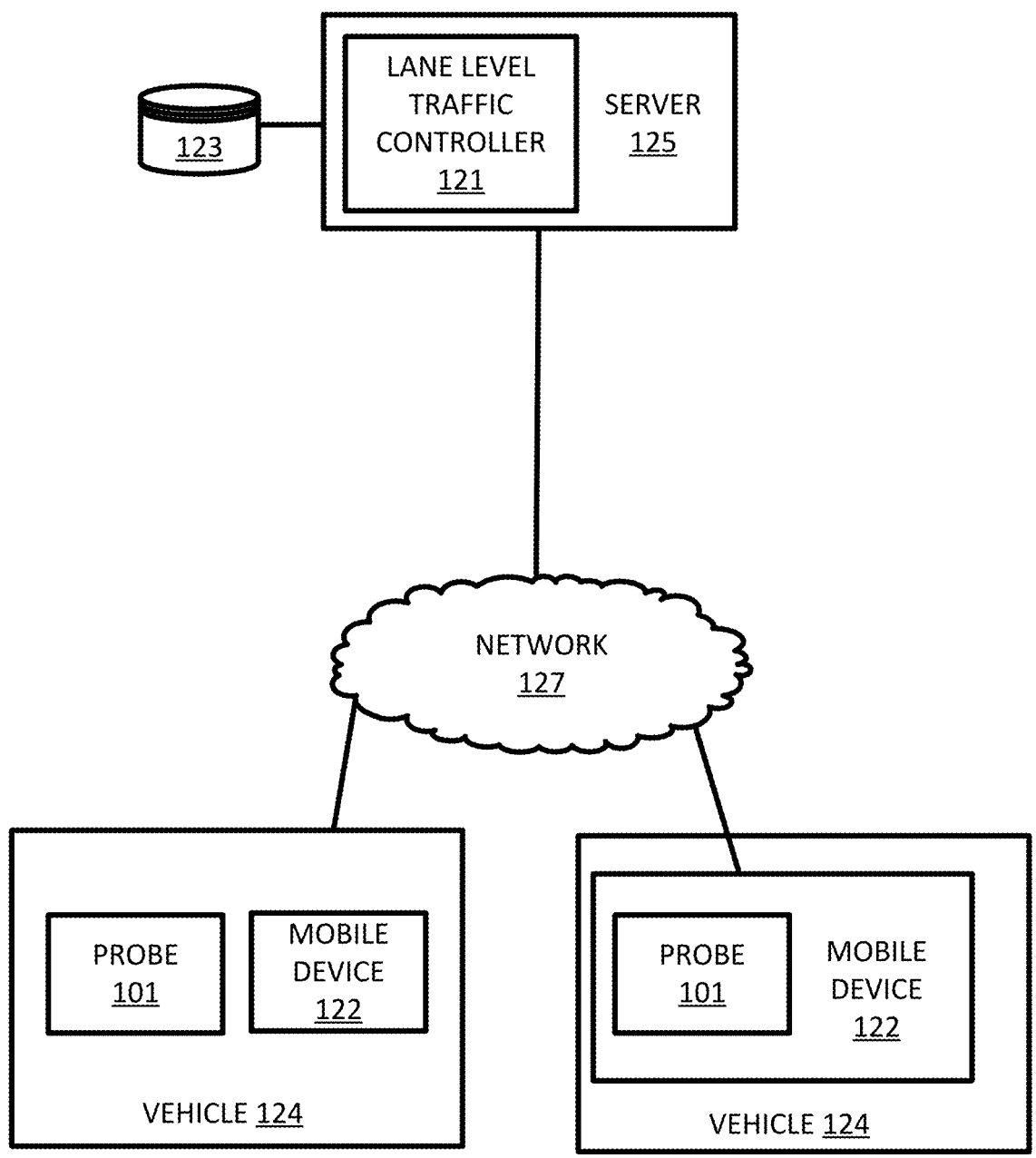
FIG. 1 illustrates an example system for lane level traffic predictions.

FIG. 1 illustrates an example system for lane level traffic predictions. The system includes a server 125 including a lane level traffic controller 121, a mobile device 122, and a network 127. A developer system may include the server 125 and a database 123. The developer system may include computer systems and networks of a navigation system operator. The mobile device 122, or multiple mobile devices, collects the probe data and the server 125 performs the following algorithms on the probe data. The vehicles 124 may be directly connected to the server 125 or through an associated mobile device 122. The server 125 and the geographic database 123, exchanges (e.g., receives and sends) data from the vehicles 124. Additional, different, or fewer components may be included.

The lane level traffic controller 121 calculates predicted traffic levels. Traffic on a given stretch of road can be characterized by velocity (v) in (distance/unit time). The distance may be miles, kilometers, meters or another length unit. The time units may be seconds, minutes, or hours. The traffic levels described by velocity may derived from probe data that provides velocity or historical data derived from the probe data. The traffic levels may be stored in the geographic database 123. Other metrics of traffic such as a traffic density (p) in (vehicles/unit distance) or a traffic flow (q) in (vehicles/unit time) may be combined with the velocity measurements in the geographic database 123.

The mobile device 122 may include mapping applications, navigational applications, or driving applications, which utilize the predicted traffic levels. Mapping applications may include a traffic map in which the predicted traffic levels are illustrated for different roadways. The predicted travel levels may be presented using colors coded for different traffic levels. Other traffic indicators may be used. The navigational applications may present routes (e.g., turn-by-turn directions) that are calculated according to the predicted traffic levels. The predicted time levels are converted to predicted travel times that are used to compare potential routes. The driving applications may provide driving warnings or commands in response to the predicted traffic levels. For lane-level traffic levels, the driving applications may instruct the driver or vehicle to change lanes.

The mobile devices 122 may include local databases corresponding to a local map, which may be modified by to the server 125 using the geographic database 123. The local map may include a subset of the geographic database 123 and is updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123.

Each vehicle 124 and/or mobile device 122 may include position circuitry (e.g., probe 101) such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
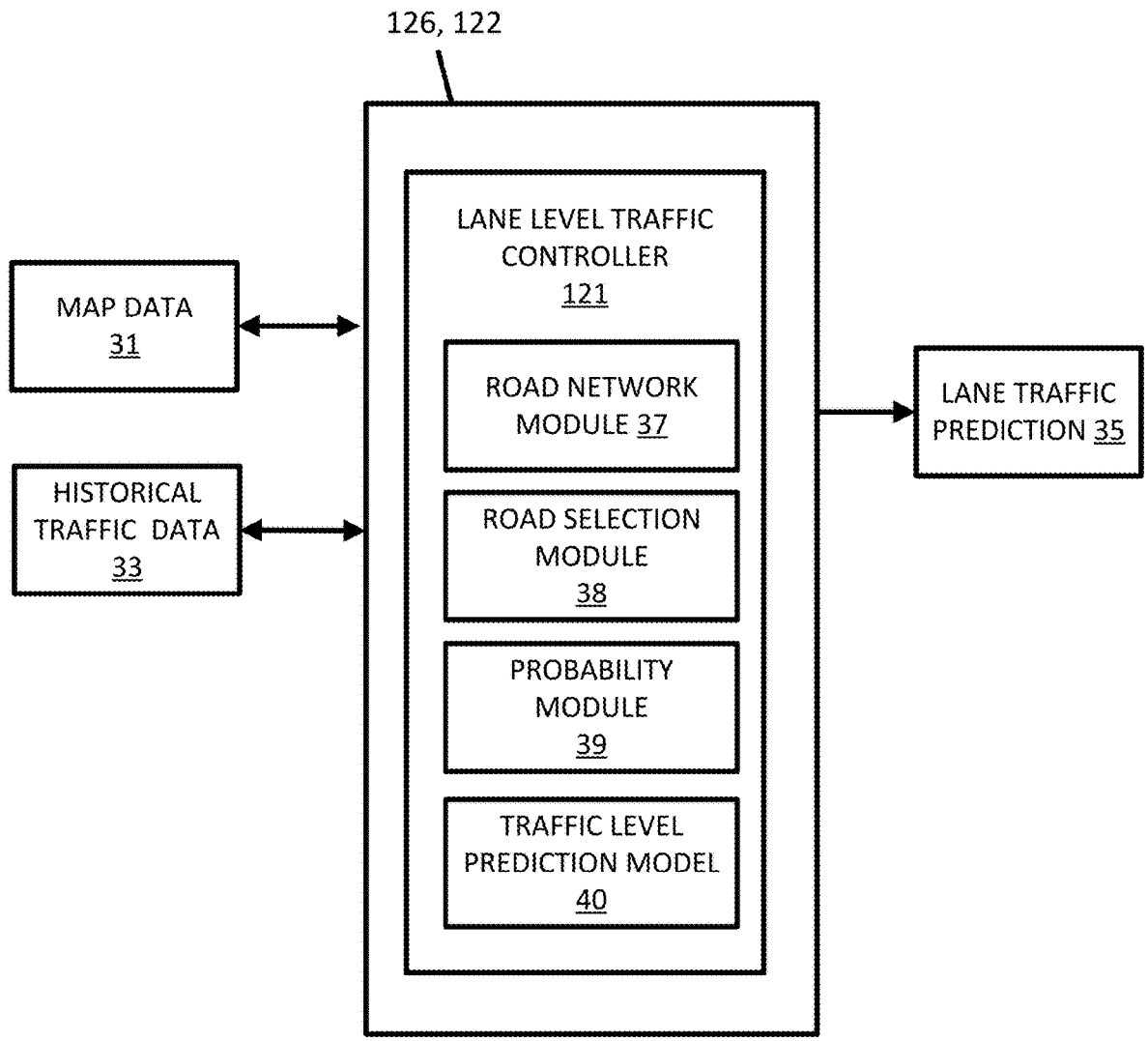
FIG. 2 illustrates an example framework for the lane level traffic controller of the system of FIG. 1.

FIG. 2 illustrates an example framework for implementing the lane level traffic controller 121. The lane level traffic controller 121 includes any combination of a road network module 37, a road selection module 38, a probability module 39, and a traffic level prediction module 40. Additional, different, or fewer components may be included.

The lane level traffic controller 121 receives map data 31 from the geographic database 123. The map data 31 may define a road network. The map data 31 may include road segments. The road segments may be indexed according to geographic coordinates. A road segment may be defined by two geographic coordinates, an origin geographic coordinate and an ending geographic coordinate. The road segment may be defined by a single geographic coordinate and a direction and/or distance for the road segment.

The lane level traffic controller 121 may generate data indicative of a road network graph based on the map data 31 and/or convert road network data from one format to another format. The road network module 37 may access the road network from the geographic database 123. The road network stored in the geographic database 123 may include road links and intersections for the connections of road links. The road links may be defined according to the intersections with other road links. The intersections may be defined according to the associated road links. The road links and the intersections may be defined according to geographic coordinates. For example, a road link may be stored with a starting geographic coordinate and an ending geographic coordinate.

Alternatively, the road network module 37 may generate the road network based on the probe data. For example, the road network module 37 analyzes the geographic extent of probes and defined road links where a predetermined number of probes have traveled. Similarly, the intersections may be defined where probes turn at a predetermined angle or more.

The road network module 37 may generate a road network graph. The road network graph may take multiple formats. The road network graph may include vertices, nodes, or points which are connected by edges, arcs, or lines. The following description uses the term nodes to represent the vertices and the term edges to represent the lines between nodes. In a first format (e.g., first road network format) graph edges represent road links and graph nodes represent the intersections of the road links. In a second format (e.g., second road network format), graph edges represent the intersections and graph nodes represent the road links.

Figure 3:
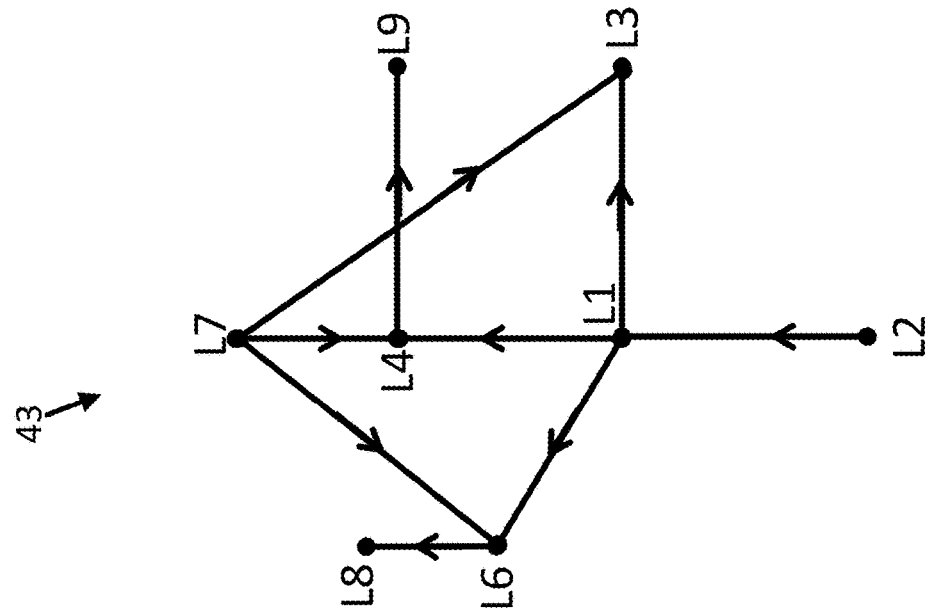
FIG. 3 illustrates an example road network graph conversion.
Figure 3:
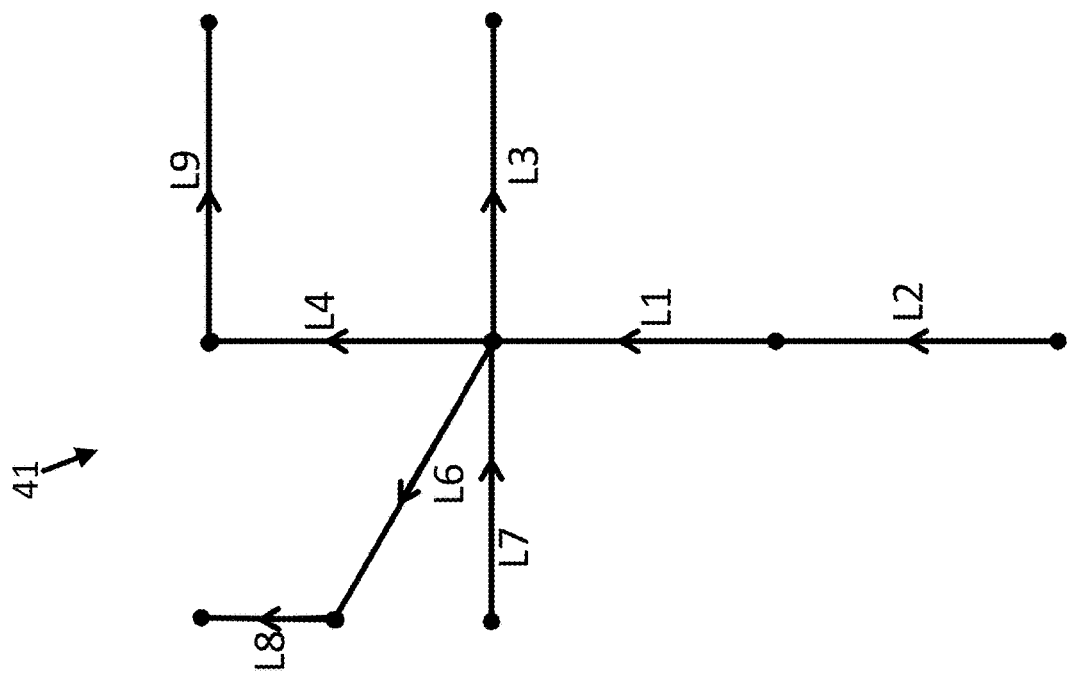

FIG. 3 illustrates an example road network graph conversion from the first road network format 41 to the second road network format 43. The first road network format 41 includes road links L1-L9 and three nodes. Each of the road links L1-L9 is associated with a single direction. Some or all of the road links may be associated with two directions in another example that is not illustrated.

At a first node, road link L6 intersection road link L8. At a second node, road link L4 intersection road link L9. At a third node, road links L1, L3, L4, L6, and L7 intersect. The direction of the road links may also impact the road network graph. For example, in the first node traffic flow is from road link L6 to road link L8 and not from road link L8 to road link L6 and in the second node traffic flow is from road link L4 to road link L9 and not from road link L9 to road link L4. In the third node, traffic flows into the node from road links L1 and L7 and out of the node via road links L3, L4, and L6.

These directions define the second road network format 43. Each of the links in the first road network format 41 are converted to nodes in the second road network format 43. For example, road link L1 in the first road network format 41 receives traffic from road link L2 and empties traffic into road links L3, L4, and L6. Accordingly, a graph edge in the second road network format extends from the node for L2 to the node for L1 and graph edges extends from the node for L1 to each of the nodes for L3, L4, and L6.

The road network module 37 is configured to convert road network data in the first road network format 41 to the second road network format 43. The road network module 37 may analyze the edges, nodes, and direction of traffic flow between nodes along edges in the first road network format 41 in order to generate the edges, nodes, and direction of traffic flow in the second road network format 43.

Figure 4:
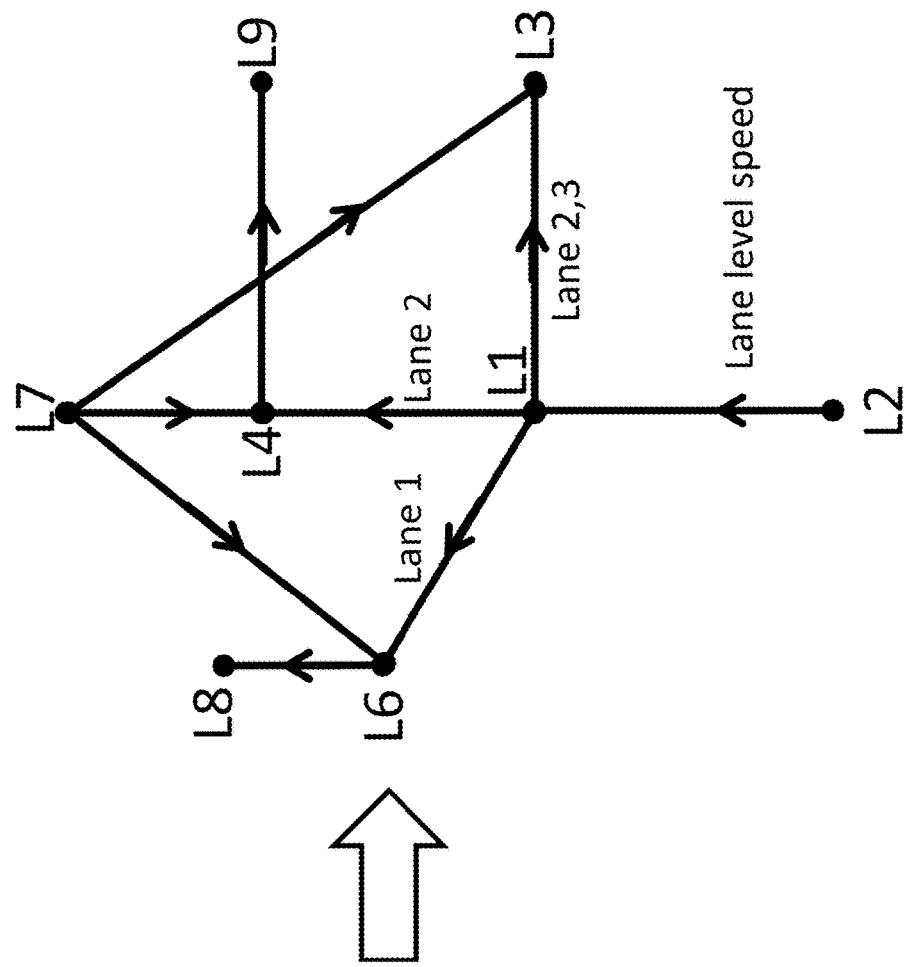
FIG. 4 illustrates an example lane level road network graph conversion.
Figure 4:
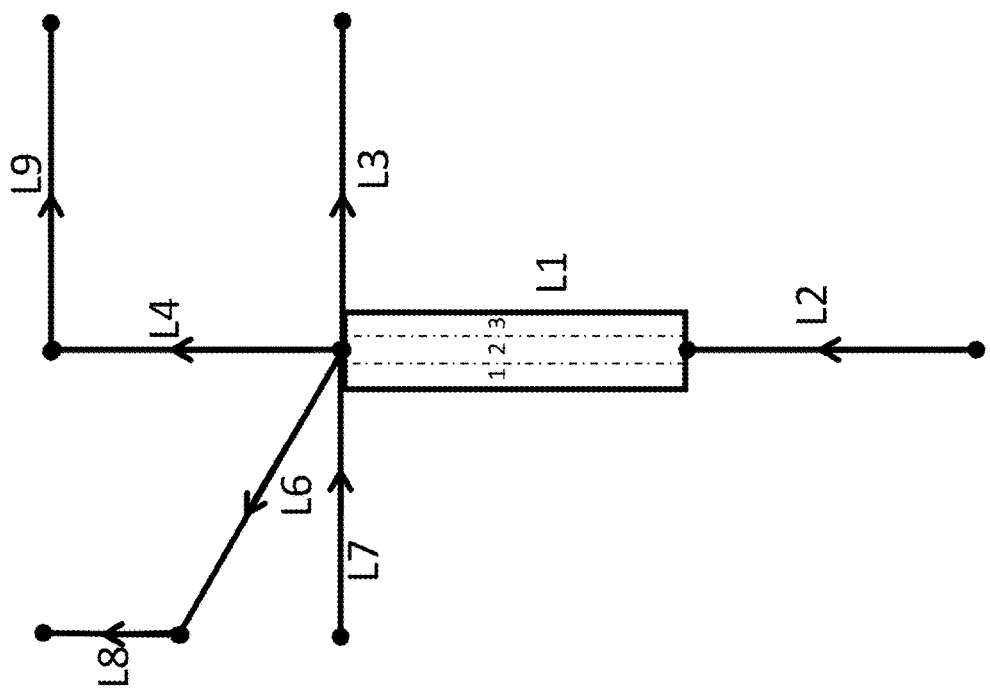

The road network module 37 is configured to identify at least one multi-lane road link including multiple lanes. FIG. 4 illustrates an example in which road link L1 has three lanes. The lanes may separate geographic areas for the road link for travel by vehicles. The lanes may be defined by a multi-lane attribute or a quantity of lanes attribute for the road link stored in the geographic database 123. The number of lanes and/or dimensions of the lanes may be defined according to manual entry of data for the road link. In one example, the lanes are modeled (e.g., stored in the geographic database 123) as separate road links. The first road network format includes an indicator of direction between at least one pair of road links and the second road network format includes at least one pair of nodes connected based on the indicator of direction from the first road network format.

The road network module 37 may identify a road link that is downstream each of the lanes in the multi-lane road link. For example, for multi-lane road link L1 in FIG. 4, the left lane (lane 1) may provide traffic only to road link L6, the middle lane (lane 2) may provide traffic only to road link L4, and the right lane (lane 3) may provide traffic only to road link L3.

Figure 5:
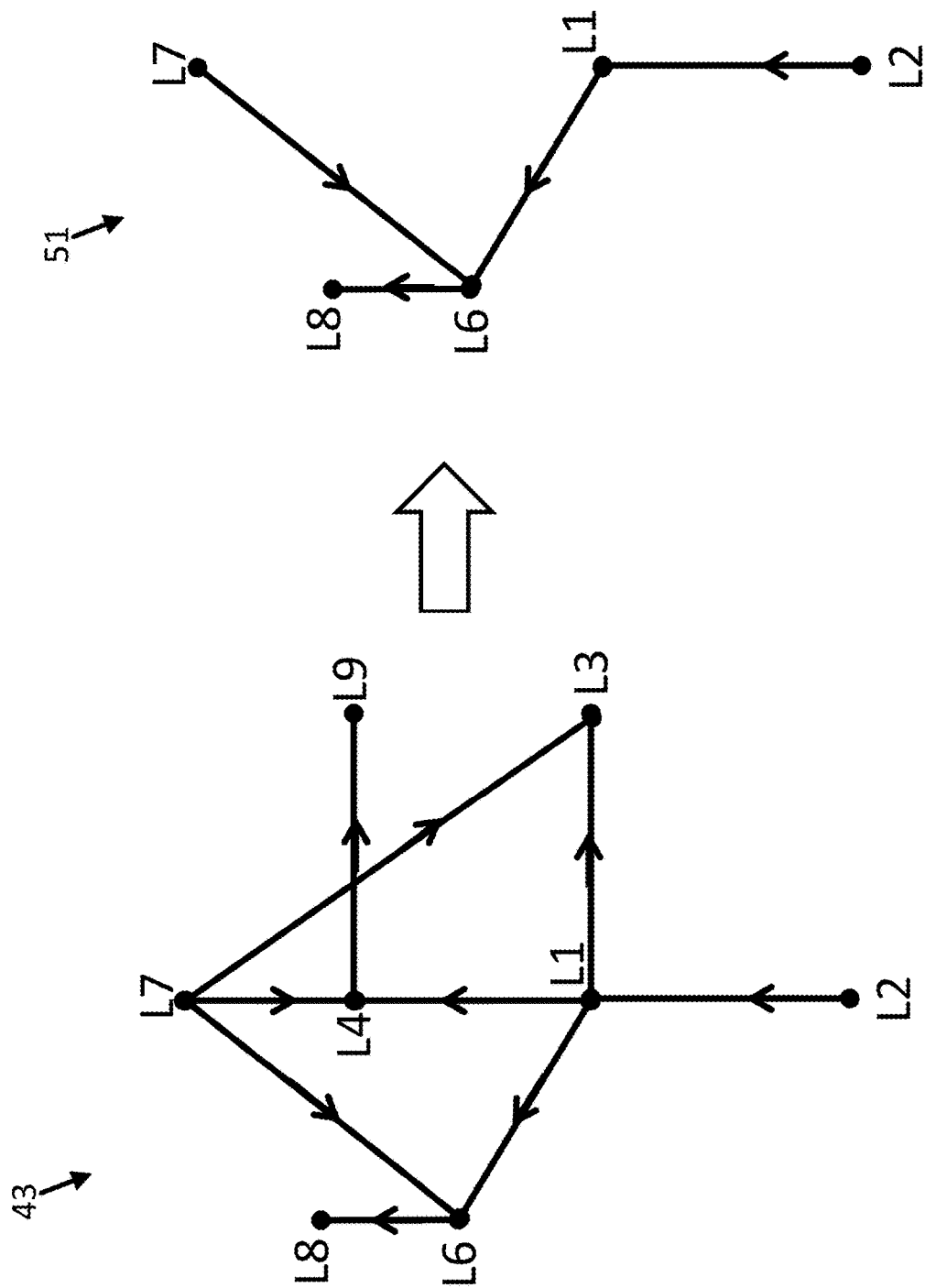
FIG. 5 illustrates an example related road subset from the road network graph of FIG. 4.

The road selection module 38 is configured to select a road link from the road links in the converted road network graph and calculate a related link subset for the selected road link. FIG. 5 illustrates a related link subset 51 for the second road network format 43. The related link subset 51 may include different road links that those illustrated in FIG. 5. The selected road link may be a single lane. Thus, the related link subset 51 for one lane in a section of road may be different than for other lanes in the section of road.

In one example, the related link subset 51 includes a multiple level hierarchy of neighboring links connected to the selected road link in the second road network format. A neighboring link may be a link that is connected to the selected road link such than the neighboring link and the selected road link share a node, as analyzed by the first road network format. A neighboring link may be a link that is connected to the selected road link such than the neighboring link and the selected road link are connected by an edge, as analyzed by the first road network format. In the example of the multi-lane road link including multiple lanes, the selected road link may be a particular lane and the neighboring link is connected to the particular lane.

The multiple level hierarchy includes at least one link downstream of the selected link and at least one link upstream of the selected link. That is in the direction of traffic flow, the road selection module 38 selects all of the road links that are downstream of the selected road link in the direction of traffic, and all of the road links that are upstream of the selected road link in the direction of traffic. In the example of the multi-lane road link including multiple lanes, the selected road link may be a particular lane and the multiple level hierarchy includes the road links that are downstream of the particular lane and the road links that are upstream of the particular lane.

In one example, the multiple level hierarchy may include the road links in the second road network format that are connected to the selected link and upstream of the selected road link and includes the road links in the second road network format that are connected to the selected link and downstream of the selected road link. The multiple level hierarchy may include the road links that are upstream of the road links in the second road network format that are connected to the selected link and downstream of the selected road link.

In one embodiment, the related link subset includes the road links downstream from the selected road link in the direction of traffic, road link upstream of the selected road links, and at least one road link upstream of a road link that is downstream of the selected road link.

The related subset of links may be defined according to the Markovian property of a stochastic transportation network to identify nearest neighbor of influence to every link that would be a representative of the influence all other links in the network as on it. The set of causal effects for these relationships may be described by a Markov blanket. The stochastic influence on a link in the network can be captured inside the Markov blanket such that every link within a link's Markov blanket (MB) is a representative of all the influence the whole network has on its traffic condition according to the road intersections in the road topology.

The Markov blanket may include the parent links to the selected road link, the children links to the selected road link, and the parent road link of the children links to the selected road links. The Markov blanket may be limited according to one or more attributes of the road network. For example, the Markov blanket may be reduced to only include causal effects between road links of the same functional classification. That is, road links stored in the database 123 with the same functional classification attribute are considered in the same Markov blanket. In other words, the system may designate that highways only affect other highways and surface streets may only affect other surface streets. In another example, road links stored in the database 123 with the same functional classification or greater (larger road) are considered in the same Markov blanket. In another example, the Markov blanket may be reduced to only include causal effects between certain functional classifications.

In one embodiment, the Markov blanket may include links selected based on a conditional probability with the selected road link. That is, for any edge link, the road selection module 38 may identify other links for the Markov blanket that are capable of influencing the state of traffic on the selected edge link. This may be based on the assumption that a transportation network imitates the Markovian network property in which the farther away (traffic) states does not have impact on the traffic of the primary link compared to closer-by (traffic) state. This principle may be derived from probabilistic graphical models (PGM). The conditional probability of link A on link B may be the probability that link B is experiencing traffic given link A is experiencing traffic. The conditional relationship between the links in the related link subset (e.g., parent links, child links, and other links) and the selected link may be greater than the minimum threshold probability.

The lane level traffic controller 121 receives historical traffic data 33. The traffic level prediction module 40 is configured to query historical data for the related link subset and determine a traffic level prediction 35 for the selected road link in response to the historical data for the related link subset. The historical data is based on probe traces collected by probes 101 or other similar devices. The historical data may be stored in a variety of formats. The following examples are one example of the historical data for the related link subset.

Table 1 illustrates a first set of data to support the Bayesian inference algorithm using historical data. Table 1 is a prior patterns data set for the related link subset. The lane level traffic controller 121 access the prior patterns set of data for the selected road link and/or the related subset of road links as a query. The prior patterns data det relates initial states of the related link subset to subsequent states of the related link subset. A state of a link may be the velocity of the probes traversing that link. The state may correspond to an individual lane of the road. The states may be grouped or discretized in a variety of techniques. One example may group the velocity by velocity intervals such as 0-10 m.p.h., 10-20 m.p.h., 20-30 m.p.h., 30-40 m.p.h., 40-50 m.p.h., and so on. Another example may group the velocity by congestion levels for the traffic states such as free flow (FF), no congestion (NC), slight congestion (SC), and heavy congestion (HC), which are listed in order of congestion level such that FF has less congestion than NC, NC has less congestion than SC, and SC has less congestion than HC. All of these examples are discretized speed levels.

In Table 1 multiple states for the related link subset (e.g., Markov blanket) are listed. For example, all possible combinations of road link states for the related link subset may be listed. If the related link subset includes three road links, and each of the road links has four congestions states (FF, NC, SC, HC), then there are 64 (4*4*4) possible combinations of road link states for the related link subset. While not all combinations may be included in the historical data, Table 1 may include the combinations that are included (or all combinations).

The prior patterns data set in Table 1 may also include a frequency value for each of the possible combinations of road link states for the related link subset. For example, in Table 1, the state combination for the related link subset in the first row has occurred 4 times, and the stated combination for the related link subset in the second row has occurred 12 times.

The prior patterns data set in Table 1 may also include a frequency of states for the selected road link that is associated with each of the possible combinations of road link stated for the related link subset. The frequency of states may list stated for the selected road link and one or more future time epochs. That is, in the first row, for time t+1, the selected road link has experienced three free flow states and one no congestion states for the four times that this combination of related subset road link exists in the historical data. Further, in the first row, for time t+2, the selected road link has experienced one free flow state, one no congestion state, one slight congestion state, and one high congestion state.

TABLE 1

| MB{EdgeA, EdgeB, EdgeC, . . . , EdgeN} States | Frequency | State of Edge @ time t + 1 | State of Edge @ time t + 2 | State of Edge @ time T |
|---|---|---|---|---|
| {FF, HC, NC, . . . , X} | 4 | FF - 3<br>NC - 1<br>SC - 0<br>HC - 0 | FF - 1<br>NC - 1<br>SC - 1<br>HC - 1 | . . . |
| {FF, HC, SC, . . . , X} | 12 | FF - 2<br>NC - 1<br>SC - 1<br>HC - 8 | FF - 2<br>NC - 1<br>SC - 3<br>HC - 5 | . . . |

TABLE 1-continued

| MB{EdgeA, EdgeB, EdgeC, . . . , EdgeN} States | Frequency | State of Edge @ time t + 1 | State of Edge @ time t + 2 | State of Edge @ time T |
|---|---|---|---|---|
| { } | 8 | FF - 2<br>NC - 1<br>SC - 1<br>HC - 8 | FF - 2<br>NC - 1<br>SC - 3<br>HC - 5 | . . . |
| . . . | . . . | . . . | . . . | . . . |
| { } | " | FF - 2<br>NC - 1<br>SC - 1<br>HC - 8 | FF - 2<br>NC - 1<br>SC - 3<br>HC - 5 | " |
| {SC, HC, NC, . . . , X} | | | | |

Table 2 illustrates a second set of data to support the Bayesian inference algorithm using historical data. Table 2 is an epoch traffic pattern data set for the related link subset. The epoch traffic pattern data set relates a frequency to stages of the related link subset. The lane level traffic controller 121 access the epoch traffic pattern data set for the related link subset. The epoch traffic pattern data set relates a frequency to stages of the related link subset for each epoch. The historical traffic data may be organized in time periods or epochs. Example sizes for time epochs include 15 minutes, 30 minutes, 1 hour, or another value.

TABLE 2

| Epoch | Edge States | Frequency |
|---|---|---|
| 1 | FF | 400 |
| | NC | 1200 |
| | SC | 8 |
| | HC | 800 |
| 2 | FF | 1200 |
| | NC | 800 |
| | SC | 400 |
| | HC | 8 |

Table 3 illustrates a second set of data to support the Bayesian inference algorithm using historical data. Table 3 is a state transition data set for the selected link. The lane level traffic controller 121 access the state transition set of data for the selected road link as a query. The state transition data initial states to subsequent states for multiple time epochs.

In Table 3 the current states for the selected road link are divided according the subsequent states at t+1 and t+2. When the current state is HC, of which there were 113 occurrences, the subsequent time period (t+1) included three free flow stated, one no congestion states, ten slight congestion states, and 100 high congestion states.

TABLE 3

| Epoch | State of Edge @ time t | Frequency | State of Edge @ time t + 1 | State of Edge @ time t + 2 | State of Edge @ time T |
|---|---|---|---|---|---|
| 1 | HC | 113 | FF - 3<br>NC - 1<br>SC - 10<br>HC - 100 | FF - 3<br>NC - 100<br>SC - 10<br>HC - 1 | . . . |
| | FF | 1000 | FF - 300<br>NC - 100<br>SC - 500<br>HC - 100 | FF - 300<br>NC - 50<br>SC - 500<br>HC - 150 | . . . |

TABLE 3-continued

| Epoch | State of Edge @ time t | Frequency | State of Edge @ time t + 1 | State of Edge @ time t + 2 | State of Edge @ time T |
|---|---|---|---|---|---|
| | NC | 10 | FF - 300<br>NC - 100<br>SC - 500<br>HC - 100 | FF - 300<br>NC - 50<br>SC - 500<br>HC - 150 | . . . |
| | SC | 50 | FF - 300<br>NC - 100<br>SC - 500<br>HC - 100 | FF - 300<br>NC - 50<br>SC - 500<br>HC - 150 | . . . |
| 2 | " | " | FF - 300<br>NC - 100<br>SC - 500<br>HC - 100 | FF - 300<br>NC - 50<br>SC - 500<br>HC - 150 | " |

Figure 6:
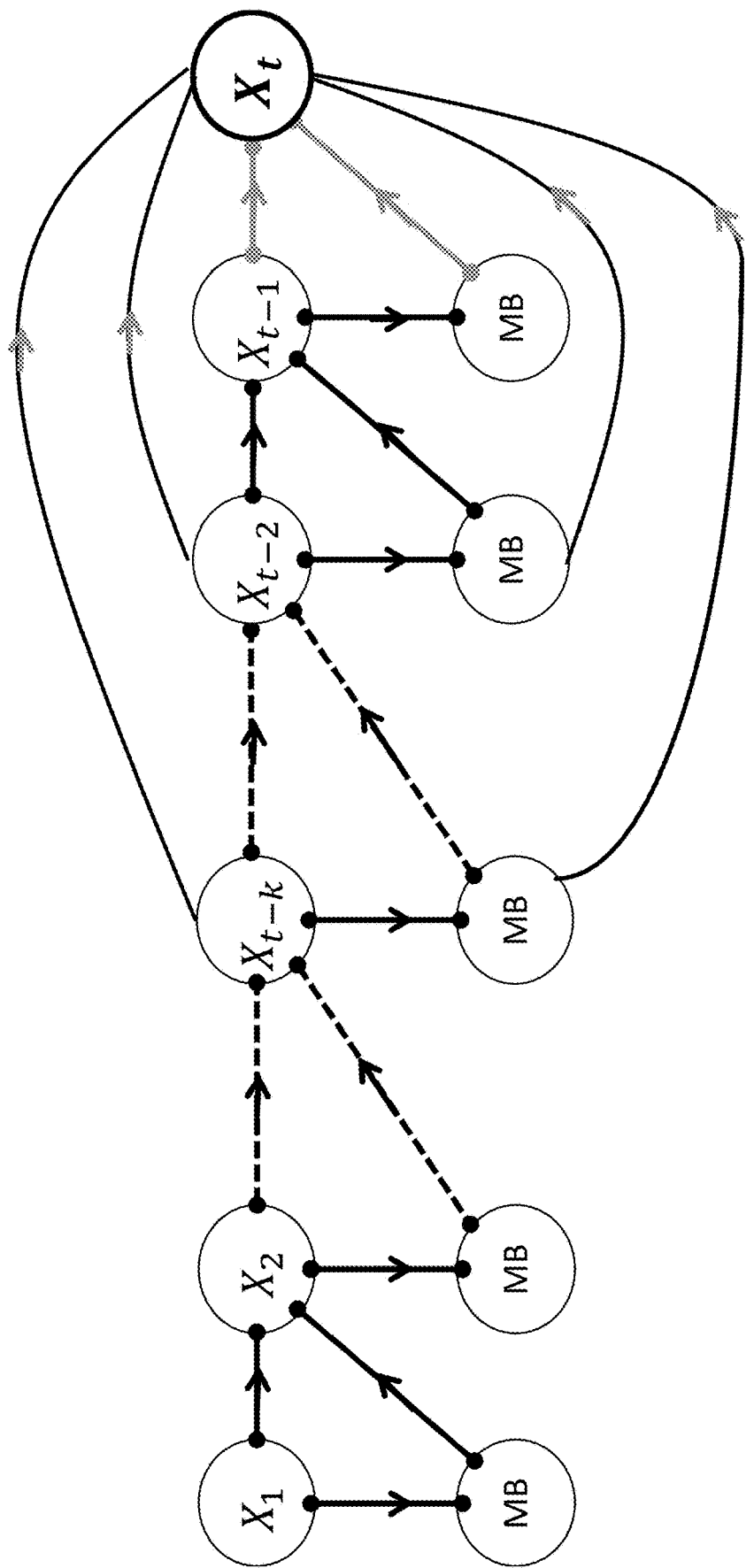
FIG. 6 illustrates an example state transition diagram for the traffic prediction.

FIG. 6 illustrates a Bayesian inference for calculating the traffic level prediction. The lane level traffic controller 121 predicts the traffic condition at time t into the future (t+1, t+2, t+k, . . . , T) for an edge $E_t^i$ in the road network graph based on the historical data. The probability of having the ith edge at time t $E_t^i$ having a state $X_t$ given previous state transitions and the Markov blanket is expressed using the Bayesian theorem in Equations 1 and 2:

$$P(X_t \mid MB_{t-k}, X_{t-k}) = \frac{P(MB_{t-k}, X_{t-k} \mid X_t) \cdot P(X_t)}{P(MB_{t-k}, X_{t-k})} \quad \text{Eq. 1}$$

$$P(X_t = x_t \mid MB_{t-k}, X_{t-k}) = \frac{P(MB_{t-k}, X_{t-k} \mid X_t = x_t) \cdot P(X_t = x_t)}{P(MB_{t-k}, X_{t-k})} \quad \text{Eq. 2}$$

Equations 1 or 2 may be applied to any of the discretized traffic levels (e.g., FF, NC, SC, HC). For example, slight congestion or SC is provided in Equation 3.

$$P(X_t = SC \mid MB_{t-k}, X_{t-k}) = \frac{P(MB_{t-k}, X_{t-k} \mid X_t = SC) \cdot P(X_t = SC)}{P(MB_{t-k}, X_{t-k})} \quad \text{Eq. 3}$$

Assuming conditional independence in Bayesian networks, the prediction of $X_t$ for $E_t^i$ will be of the form of Equation 4:

$$E_t^i = \underset{\{NC,FF,HC,SC\}}{\operatorname{argMax}} P(MB_{t-k} \mid X_t) \cdot P(X_{t-k} \mid X_t) \cdot P(X_t) \quad \text{Eq. 4}$$

The probability value for $P(MB_{t-k}|X_t)$ is retrieved from Table 1 using pattern recognition and nearest neighbor search (NNS) algorithm in which the closest ordered state of the MB edges is taken as the MB state at t-k. NNS can be achieved by embedding distance cost metrics between the states (i.e. NC to SC=1, FF to SC=2, FF to FF=0, HC to SC=1, FF to HC=3). $P(X_{t-k}|X_t)$ may be retrieved from Table 3. $P(X_t)$ may be retrieved from Table 2.

Consider an example using Equation 4 in which the traffic state in the future is calculated for each possible state based on current states and the data stored in Tables 1-3. The maximum value is selected as the future traffic state for a selected link.

For example, let k=1 to represent current time t−1 for predicting the traffic state in the future $X_t$. For a possible state $X_t$=NC, the value for $P(MB_{t-1}|NC)$ is determined from the related links (e.g., MB), which may be {Link_ID1: NC,Link_ID2: HC,Link_ID3:FF}. This pattern may be obtained from the related links to edge $E_{t-1}{}^i$ observed from sensors. As an example, Table 1 may provide that the probability (temporary) for this pattern is 0.3. The value for $P(X_{t-1}|X_t)=P(SC|X_t)$, or specifically P(SC|NC)=0.2 is obtained from Table 3. The value for $P(X_t=NC)$ is obtained from Table 2 as 0.4. Thus, using these values provides by Tables 1-3, the prediction from equation 4 is the probability for Xt=NC=0.3×0.2×0.4=0.024. This process is repeated for $X_t$=FF, to provide a probability (temporary) for Xt=FF=0.17, repeated for $X_t$=HC to provide a probability (temporary) for $X_t$=HC=0.26, and repeated for $X_t$=SC probability (temporary) for Xt=SC=0.06. Then the argmax function determines which state produced the highest probability of all the temporary probabilities, specifically, the maximum value of 0.26 which is the state when Xt=HC. Hence the prediction of traffic state on $E_t{}^i$ is HC. So the traffic changed from SC at $X_{t-1}$ to HC at $X_t$.

Therefore, at any time t-k (in real-time) the future traffic condition at time t for any edge in the road network graph is predicted by the lane level traffic controller 121. The lane level traffic controller 121 may store a predicted traffic array for each of the road links, which may be individual lanes of travel. The traffic array may include a predicted traffic level at multiple time intervals for the road link. The multiple time intervals may include one time unit into the future, two time units in the future, and so on (t+1, t+2, t+3, T). The time units may be configurable by the user and a time unit may be one minute, five minutes, 10 minutes, 30 minutes, 1 hour, 2 hours, or another value.

Figure 7:
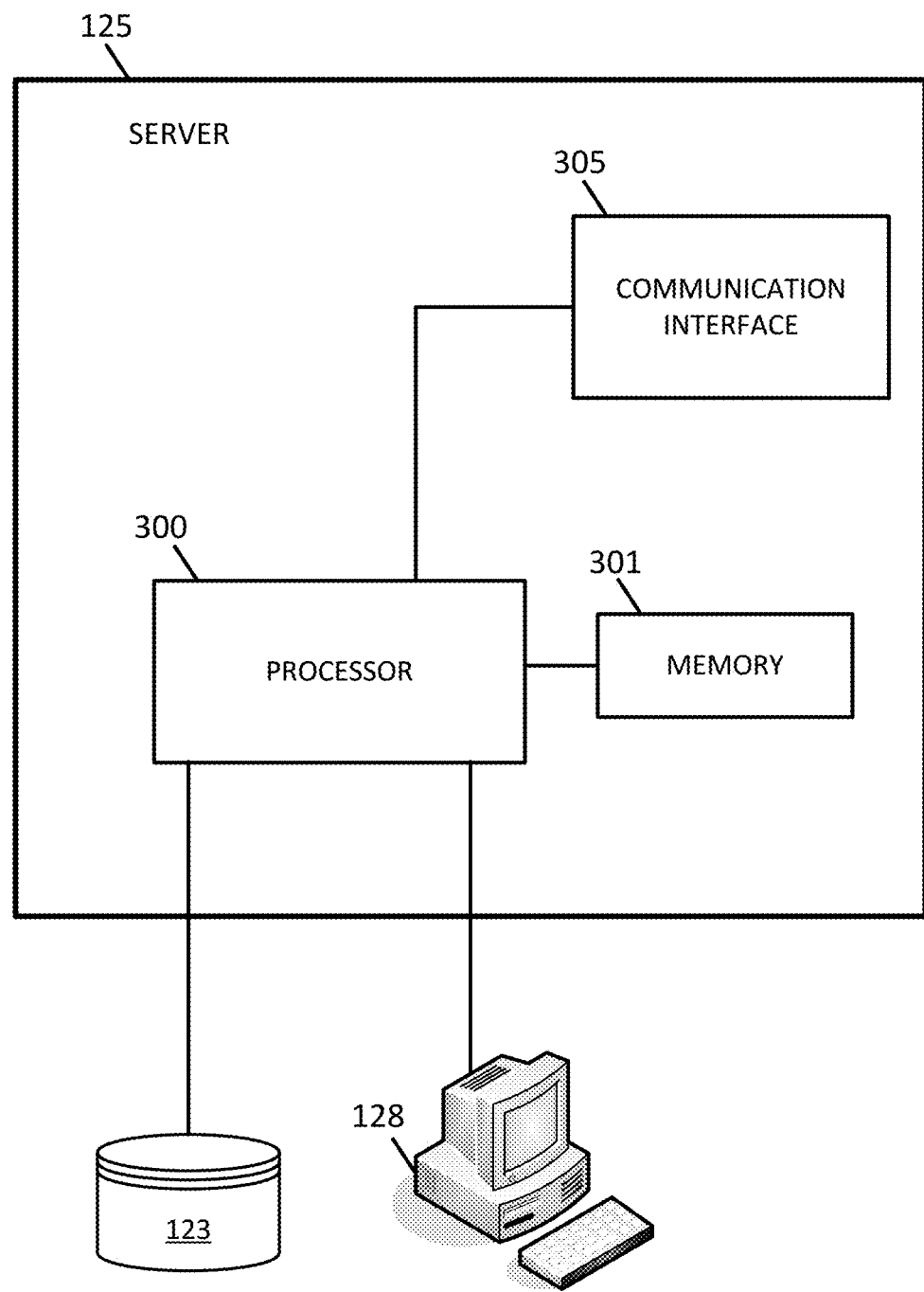
FIG. 7 illustrates an example server implementation of the lane feature controller.

FIG. 7 illustrates an example server implementation of the lane level traffic controller 121. FIG. 20 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 8:
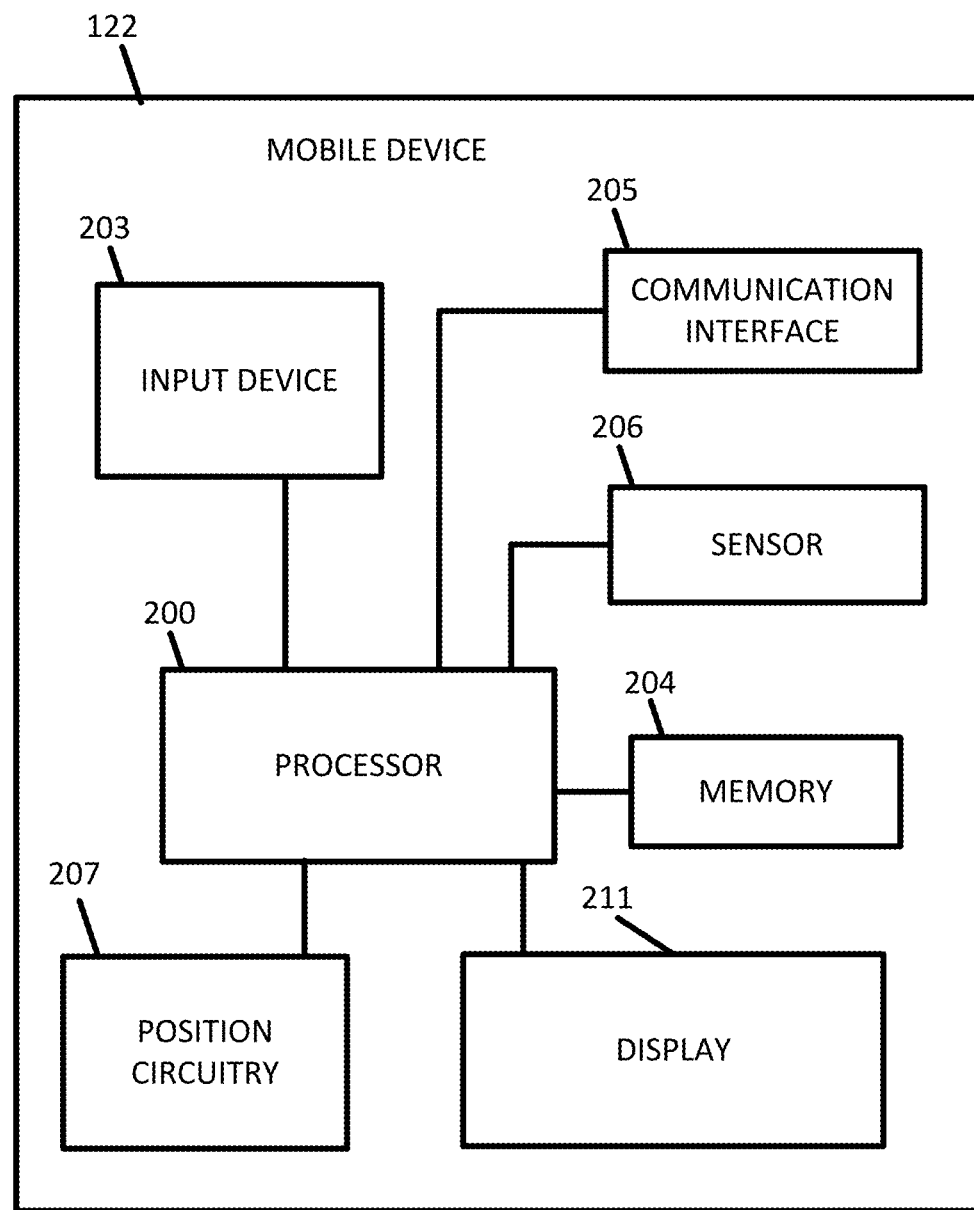
FIG. 8 illustrates an example mobile device implementation of the lane feature controller.

FIG. 8 illustrates an example mobile device implementation of the lane level traffic controller 121. FIG. 15 illustrates an exemplary mobile device 122 of the system of FIG. 1. The mobile device 122 includes a processor 200, a memory 204, an input device 203, a communication interface 205, position circuitry 207, a display 211, and a sensor 206. The sensor 206 may include one or more of the sensors described with respect to FIG. 10. The input device 203 may receive commands from the user for default settings for the lane level traffic predictions. The default settings may include the number or types of lanes that are analyzed, the ranges for the congestions levels, and the topology for the related link subset.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 9:
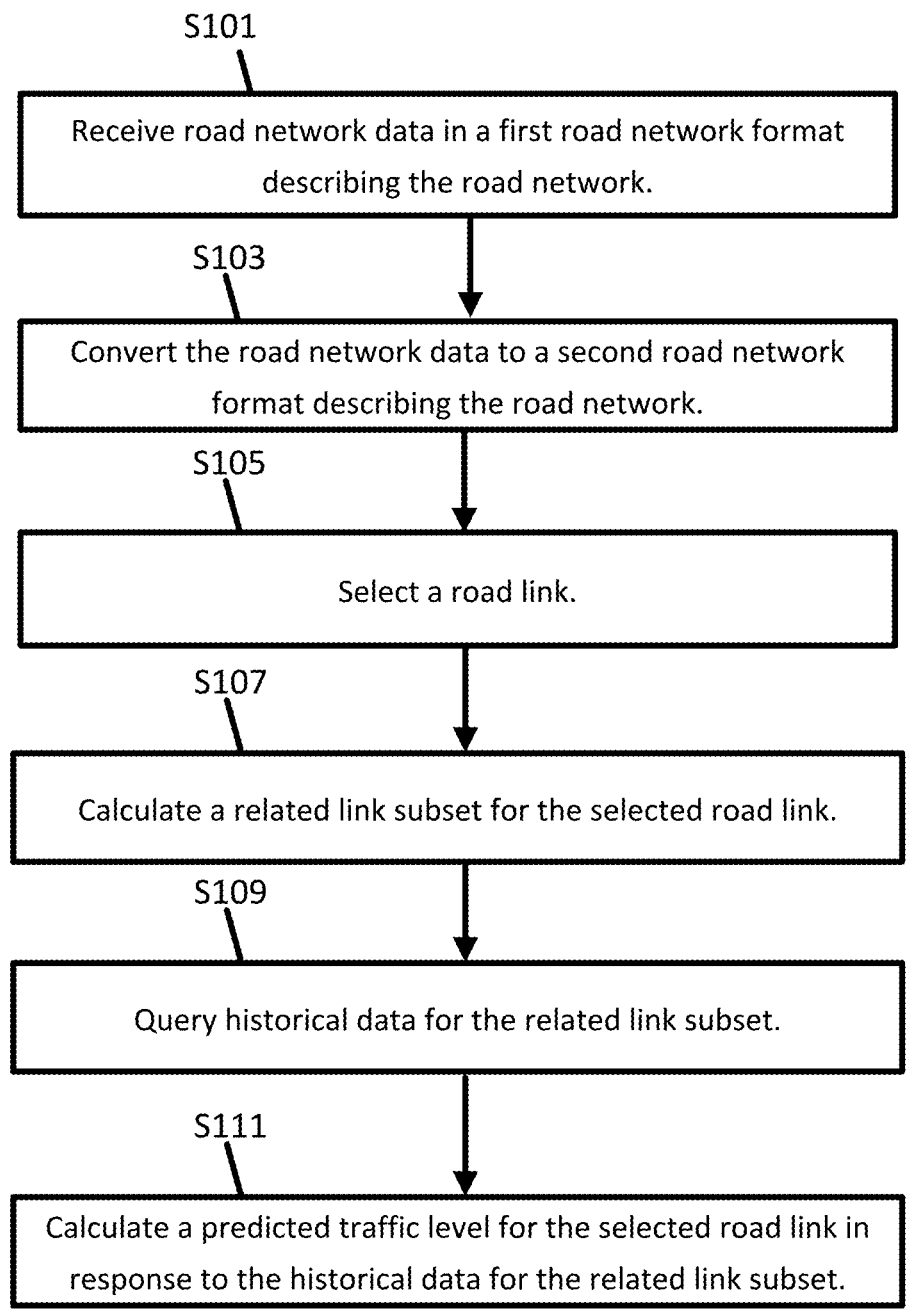
FIG. 9 illustrates an example flow chart for the operations of the server and/or the mobile device.

FIG. 9 illustrates an example flow chart for the operations of the server and/or the mobile device. Either the mobile device 122 or the server 125 performs the acts of FIG. 9. The operations of the processor 200 or the processor 300 in the alternative may be described with respect to a controller. Additional, different, or fewer acts may be provided. The resulting lane traffic predictions may be provided back to the mobile device 122 or other mobile devices 122 for the location based service.

At act S101, the controller accesses or receives the road network data in a first road network format describing a road network including road links and intersections. The geographic database 123 may store the road network in the first road network format. In the first road network format edges of the graph correspond to roads, and the nodes correspond to the intersections of roads. Alternatively, the communication interface 205 or the communication interface 305 are example means for receiving the road network data.

At act S103, the controller converts the road network data to a second road network format describing the road network. In the second road network format, graph edges correspond to the intersections of road and graph nodes correspond to the road links. The controller may convert the road network data format by analyzing the direction of travel between road links and generating graph edges in response to each direction of travel. The controller may convert the road network data format by selecting individual lanes and mapping the lane level travel between road links as edges that connect nodes in the second road network format.

The processor 200 or the processor 300 may include network graph conversion module including an application specific module or processor that generates the road network graph in the second road network format. The processor is an example means for converting the road network graph from the first format to the second format.

At act S105, the controller selects a road link. The road link may be one road link of a route or a proposed route. For example, the controller may calculate multiple potential routes and compare the routes according to their respective traffic prediction values. For each route, each road link is selected and analyzed to determine a corresponding traffic prediction value. The distance of the road link along the route, in addition to the time to traverse earlier road links in the route, determines a time value for the selected road link.

The processor 200 or the processor 300 may include link selection module including an application specific module or processor that selects the road link under analysis. The processor is an example means for selecting the road link.

The selected road link may be a lane of a multi-lane roadway. The controller may receive position data collected by the position circuitry 207 of the mobile device 122. The controller may perform map matching between the position data at the road network in order to identify the road link.

At act S107, the controller calculates a related link subset from the plurality of road links for the selected road link. The related link subset may include links that impact the traffic on the selected link. The related link subsets may be links that have a conditional probability higher than a threshold level. The conditional probability is the probability of a change in traffic on the selected road link given a change in traffic on the related link. The related link subset may include children of the selected link, parents of the selected link, and parents of the children of the selected link.

The processor 200 or the processor 300 may include related link module including an application specific module or processor that selects the related road links. The processor is an example means for calculating a related link subset.

At act S109, the controller queries historical data for the related link subset. The historical data may be data collected by probes 101 for the related link subset. The processor 200 or the processor 300 may include historical data module including an application specific module or processor that access the historical data. The processor is an example means for querying the historical data for the related link subset.

At act S111, the controller calculates a predicted traffic level for the selected road link in response to the historical data for the related link subset. The processor 200 or the processor 300 may include traffic prediction module including an application specific module or processor that calculates the traffic level. The processor is an example means for calculating the predicted traffic level for the selected road link.

The predicted traffic level may be based on multiple probability values from the historical traffic data. The controller may access a prior patterns data set for the related link subset, access an epoch traffic pattern data set for the related link subset, and access a state transition data set for the related link subset. The predicted travel level is calculated from a first probability determined from the prior patterns data set, a second probability determined from the epoch traffic pattern data set and a third probability determined from the state transition data set.

The lane level traffic controller 121 may modify the geographic database 123 to provide navigation applications, mapping applications, or driving applications in response to the detected lane features as described in more detail below.

Figure 10:
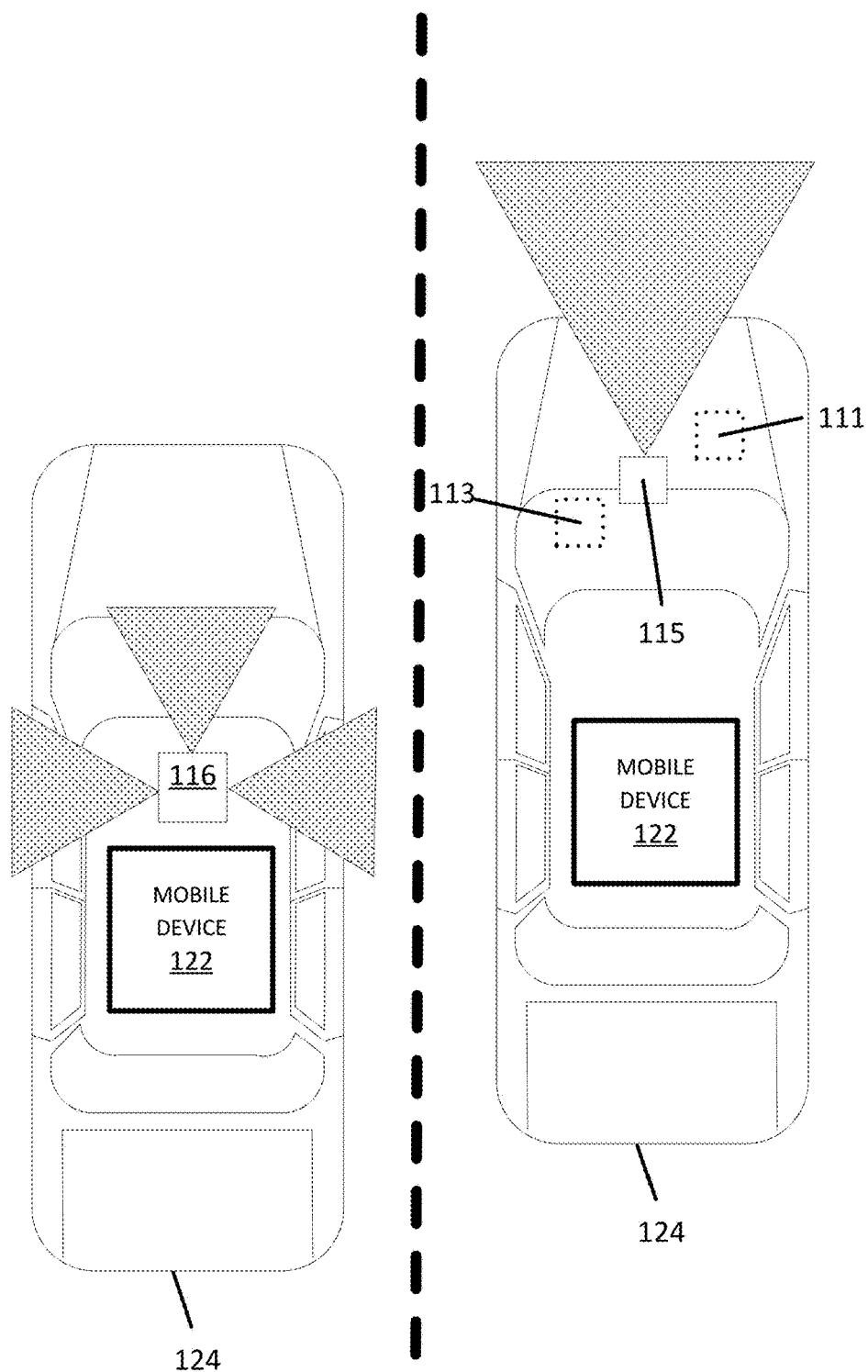
FIG. 10 illustrates exemplary vehicles of the systems of FIG. 1.

FIG. 10 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the predicted traffic levels for future road links, or road links on the current route of the vehicle 124, and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the detected lane features and/or other geographic data received from geographic database 123 and the server 125 to generate driving commands or navigation commands. For example, the may provide a driving command to the vehicle 124 based on the predicted traffic level. The driving command may identify a lane change in response to the lane feature in order to select a lower cost lane (e.g., faster lane).

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the lane level traffic levels and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane level traffic levels and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the predicted traffic levels and other factors.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 11:
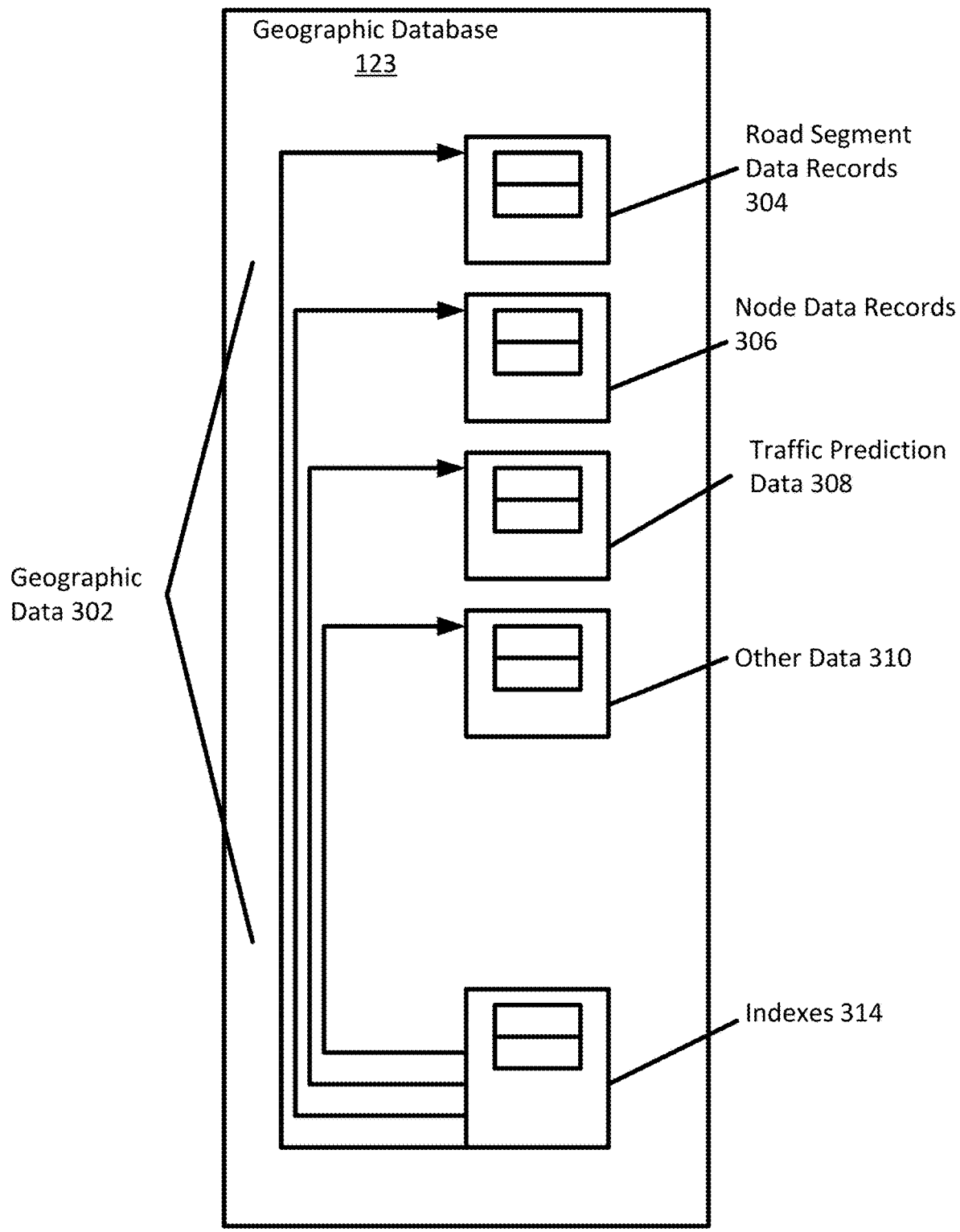
FIGS. 11 and 12 illustrate example geographic databases.

In FIG. 11, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate lane level traffic predictions 308 with a road segment in the segment data records 304 or a geographic coordinate. An index 314 may, for example, store lane level traffic prediction data 308 at different times in the future. The index 314 may include an array of traffic level predictions at different times.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 12:
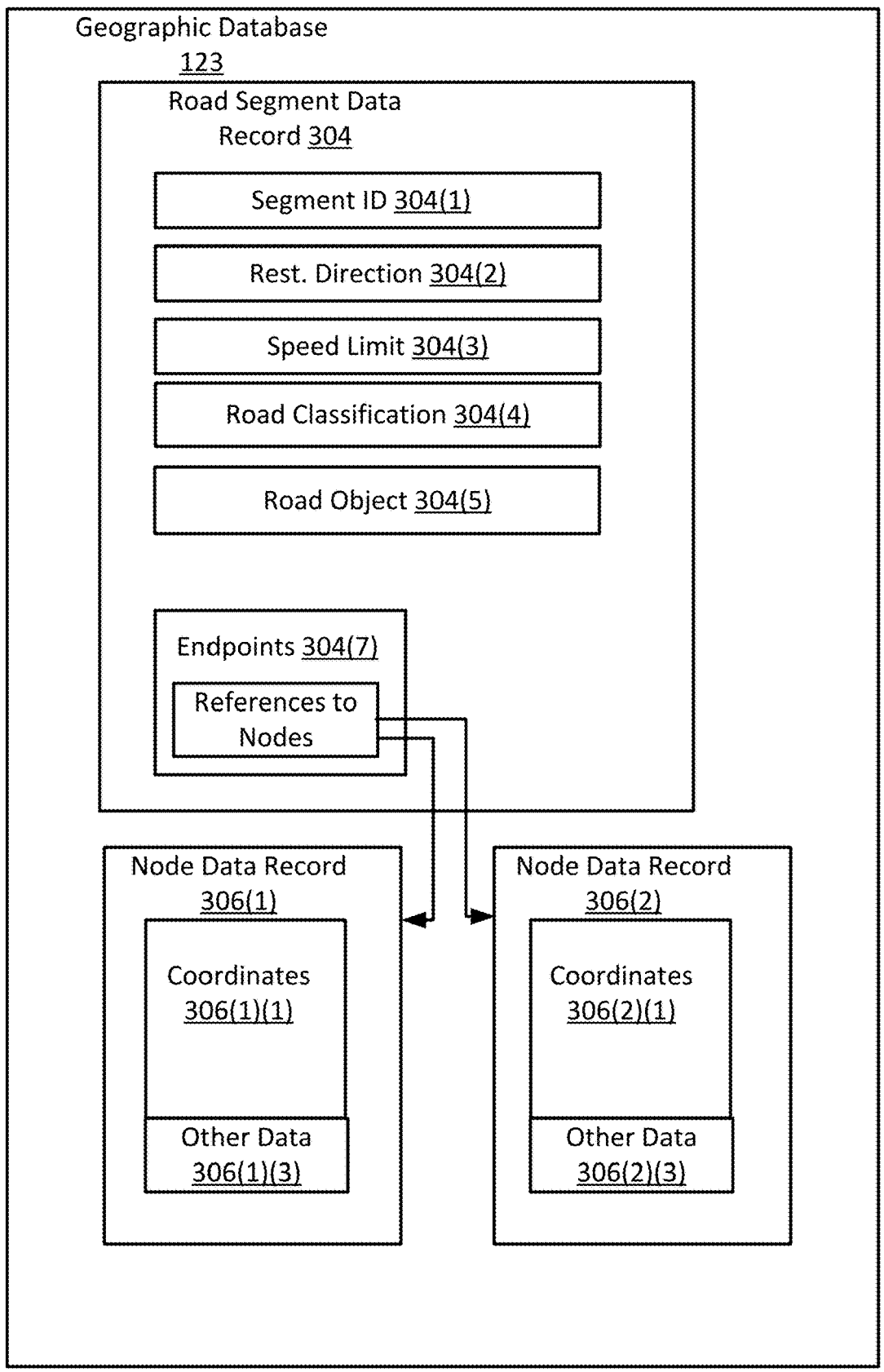

FIG. 12 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe predicted traffic levels 304(5). The predicted traffic levels 304(5) may include a predicted level for a current time as well as predicted traffic levels for future times such as t+1, t+2, and so on.

Additional schema may be used to describe road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 12 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, the node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for predicting future traffic for a roadway, the method comprising:
  receiving road network data in a first road network format describing a road network including a plurality of road links and a plurality of intersections, wherein the first road network format includes graph edges for the plurality of road links and graph nodes for the plurality of intersections;
  converting the road network data to a second road network format describing the road network, wherein the second road network format includes graph edges for the plurality of intersections and graph nodes for the plurality of road links;
  selecting a road link from the plurality of road links;
  calculating a related link subset from the plurality of road links for the selected road link;
  querying historical data for the related link subset; and
  calculating a predicted traffic level for the selected road link in response to the historical data for the related link subset.

Embodiment 2

The method of embodiment 1, further comprising:
  identifying a multi-lane road link including a plurality of lanes with at least one lane upstream of the selected road link, the at least one lane connected to the selected road link in the second road network format.

Embodiment 3

The method of embodiment 1 or 2, further comprising:
  receiving position data from a mobile device; and
  matching the multi-lane road link to the position data.

Embodiment 4

The method of any of embodiments 1 to 3, wherein the related link subset includes a multiple level hierarchy of neighboring links connected to the selected road link in the second road network format.

Embodiment 5

The method of any of embodiments 1 to 4, wherein the multiple level hierarchy includes at least one link downstream of the selected link and at least one link upstream of the selected link.

Embodiment 6

The method of any of embodiments 1 to 5, wherein the multiple level hierarchy includes at least one link upstream of a road link that is downstream of the selected link.

Embodiment 7

The method of any of embodiments 1 to 6, wherein the multiple level hierarchy includes at least one link downstream of the selected link and at least one link upstream of the selected link.

Embodiment 8

The method of any of embodiments 1 to 7, wherein the multiple level hierarchy includes the road links in the second road network format that are connected to the selected link and upstream of the selected road link and includes the road links in the second road network format that are connected to the selected link and downstream of the selected road link.

Embodiment 9

The method of any of embodiments 1 to 8, wherein the multiple level hierarchy includes the road links that are upstream of the road links in the second road network format that are connected to the selected link and downstream of the selected road link.

Embodiment 10

The method of any of embodiments 1 to 9, further comprising:
accessing a prior patterns data set for the related link subset, wherein the prior patterns data set relates initial states of the related link subset to subsequent states of the related link subset.

Embodiment 11

The method of any of embodiments 1 to 10, wherein the initial states and the subsequent states are discretized speed levels.

Embodiment 12

The method of any of embodiments 1 to 11, further comprising:
accessing an epoch traffic pattern data set for the related link subset, wherein the epoch traffic pattern data set relates a frequency to stages of the related link subset.

Embodiment 13

The method of any of embodiments 1 to 12, further comprising:
accessing a state transition data set for the related link subset, wherein the state transition data associates initial states to subsequent states for each of a plurality of time epochs.

Embodiment 14

The method of any of embodiments 1 to 13, further comprising:
accessing a prior patterns data set for the related link subset, accessing an epoch traffic pattern data set for the related link subset, and accessing a state transition data set for the related link subset, wherein a probability $E_t^i$ of the selected road link (i) at time (t) that the predicted traffic level has a state $X_t$ based on the related link subset (MB) is calculated according to:

$E_t^i = \arg \text{Max}[P(MB_{t-k}|X_t) \cdot P(X_{t-k}|X_t) \cdot P(X_t)]$, wherein a first probability $P(MB_{t-k}|X_t)$ is determined from the prior patterns data set, a second probability $P(X_{t-k}|X_t)$ is determined from the epoch traffic pattern data set and a third probability $P(X_t)$ is determined from the state transition data set.

Embodiment 15

The method of any of embodiments 1 to 14, further comprising:
accessing a prior patterns data set for the related link subset, accessing an epoch traffic pattern data set for the related link subset, and accessing a state transition data set for the related link subset, wherein the predicted traffic level is calculated from a first probability determined from the prior patterns data set, a second probability determined from the epoch traffic pattern data set and a third probability determined from the state transition data set.

Embodiment 16

The method of any of embodiments 1 to 15, wherein the first road network format includes an indicator of direction between at least one pair of the plurality of road links, and the second road network format includes at least one pair of nodes connected based on the indicator of direction from the first road network format.

Embodiment 17

An apparatus, configured to perform and/or control the method of any of embodiments 1-16 or comprising means for performing and/or controlling any of embodiments 1-16.

Embodiment 18

An apparatus, comprising at least one processor and at least one memory including computer program code for one or more programs, the at least one memory and the computer program code configured to, with the at least one processor, to perform and/or control the method of any of embodiments 1-16.

Embodiment 19

A computer program comprising instructions operable to cause a processor to perform and/or control the method of any of embodiments 1-16, when the computer program is executed on the processor.

I claim:
1. A method for predicting future traffic for a roadway, the method comprising:
updating a geographic database including directions of travel by vehicles while the vehicles are traveling;
receiving road network data from the geographic database in a first road network format describing a road network including a plurality of road links and a plurality of intersections, wherein the first road network format includes graph edges for the plurality of road links and graph nodes for the plurality of intersections;
converting, by a processor, the road network data in the first road network format to a second road network format describing the road network by analyzing a direction of travel by the vehicles between at least one pair of the plurality of road links in the first road network format, wherein the second road network format includes graph edges for the plurality of intersections and graph nodes for the plurality of road links;
selecting, by the processor, a road link from the plurality of road links in the second road network format;
calculating, by the processor, a related link subset from the plurality of road links for the selected road link;
querying, by the processor, historical data for the related link subset from the geographic database;
calculating, by the processor, a predicted traffic level for the selected road link in response to the historical data for the related link subset; and
modifying, by the processor, a route generation in response to the predicted traffic level.

2. The method of claim 1, further comprising:
identifying a multi-lane road link including a plurality of lanes with at least one lane upstream of the selected road link, the at least one lane connected to the selected road link in the second road network format.

3. The method of claim 2, further comprising:
receiving position data from a mobile device; and
matching the multi-lane road link to the position data.

4. The method of claim 1, wherein the related link subset includes a multiple level hierarchy of neighboring links connected to the selected road link in the second road network format.

5. The method of claim 4, wherein the multiple level hierarchy includes at least one link downstream of the selected link and at least one link upstream of the selected link.

6. The method of claim 4, wherein the multiple level hierarchy includes at least one link upstream of a road link that is downstream of the selected link.

7. The method of claim 4, wherein the multiple level hierarchy includes at least one link downstream of the selected link and at least one link upstream of the selected link.

8. The method of claim 4, wherein the multiple level hierarchy includes the road links in the second road network format that are connected to the selected link and upstream of the selected road link and includes the road links in the second road network format that are connected to the selected link and downstream of the selected road link.

9. The method of claim 8, wherein the multiple level hierarchy includes the road links that are upstream of the road links in the second road network format that are connected to the selected link and downstream of the selected road link.

10. The method of claim 1, further comprising:
accessing a prior patterns data set for the related link subset, wherein the prior patterns data set relates initial states of the related link subset to subsequent states of the related link subset.

11. The method of claim 10, wherein the initial states and the subsequent states are discretized speed levels.

12. The method of claim 1, further comprising:
accessing an epoch traffic pattern data set for the related link subset, wherein the epoch traffic pattern data set relates a frequency to stages of the related link subset.

13. The method of claim 1, further comprising:
accessing a state transition data set for the related link subset, wherein the state transition data associates initial states to subsequent states for each of a plurality of time epochs.

14. The method of claim 1, further comprising:
accessing a prior patterns data set for the related link subset, accessing an epoch traffic pattern data set for the related link subset, and accessing a state transition data set for the related link subset, wherein the predicted traffic level is calculated from a first probability determined from the prior patterns data set, a second probability determined from the epoch traffic pattern data set and a third probability determined from the state transition data set.

15. The method of claim 1, wherein the first road network format includes an indicator of the direction of travel by the vehicles between the at least one pair of the plurality of road links, and the second road network format includes at least one pair of nodes connected based on the indicator of the direction of travel by the vehicles between the at least one pair of the plurality of road links from the first road network format.

16. A method for predicting future traffic for a roadway, the method comprising:
updating a geographic database including directions of travel by vehicles while the vehicles are traveling;
receiving road network data from the geographic database in a first road network format describing a road network including a plurality of road links and a plurality of intersections, wherein the first road network format includes graph edges for the plurality of road links and graph nodes for the plurality of intersections;
converting, by a processor, the road network data in the first road network format to a second road network format describing the road network by analyzing a direction of travel by the vehicles between at least one pair of the plurality of road links in the first road network format, wherein the second road network format includes graph edges for the plurality of intersections and graph nodes for the plurality of road links;
selecting, by the processor, a road link from the plurality of road links in the second road network format;
calculating, by the processor, a related link subset from the plurality of road links for the selected road link;
querying, by the processor, historical data for the related link subset from the geographic database;
calculating, by the processor, a predicted traffic level for the selected road link in response to the historical data for the related link subset;
accessing a prior patterns data set for the related link subset, accessing an epoch traffic pattern data set for the related link subset, and accessing a state transition data set for the related link subset, wherein a probability $E_t^i$ of the selected road link (i) at time (t) that the predicted traffic level has a state $X_t$ based on the related link subset (MB) is calculated according to:

$$E_t^i = \arg \text{Max}[P(MB_{t-k}|X_t) \cdot P(X_{t-k}|X_t) \cdot P(X_t)],$$

wherein a first probability $P(MB_{t-k}|X_t)$ is determined from the prior patterns data set, a second probability $P(X_{t-k}|X_t)$ is determined from the epoch traffic pattern data set and a third probability $P(X_t)$ is determined from the state transition data set; and
modifying, by the processor, a route generation in response to the predicted traffic level.

17. An apparatus for predicting future traffic for a roadway, the apparatus further comprising:
a processor configured to convert road network data, received from a geographic database including directions of travel by vehicles and updated while the vehicles are traveling, in a first road network format describing a road network including a plurality of road links and a plurality of intersections to a second road network format describing the road network by analyzing a direction of travel by the vehicles between at least one pair of the plurality of road links in the first road network format, wherein the first road network format includes graph edges for the plurality of road links and graph nodes for the plurality of intersections, and the second road network format includes graph edges for the plurality of intersections and graph nodes for the plurality of road links;
the processor further configured to select a road link from the plurality of road links in the second road network format and calculate a related link subset from the plurality of road links for the selected road link;
the processor further configured to query historical data for the related link subset from the geographic database and determine a predicted traffic level for the selected road link in response to the historical data for the related link subset; and
the processor further configured to modify a route generation in response to the predicted traffic level.

18. The apparatus of claim 17, further comprising:
a probability calculation module configured to calculate at least one set of data to support a Bayesian inference algorithm using historical data to determine the traffic level prediction.

19. The apparatus of claim 18, wherein the at least one set of data includes a prior patterns data set for the related link subset, an epoch traffic pattern data set for the related link subset, and a state transition data set for the related link subset, wherein a probability $E_t^i$ of the selected road link (i) at time (t) that the predicted traffic level has a state $X_t$ based on the related link subset (MB) is calculated according to:

$$E_t^i = \arg \text{Max}[P(MB_{t-k}|X_t) \cdot P(X_{t-k}|X_t) \cdot P(X_t)],$$

wherein a first probability $P(MB_{t-k}|X_t)$ is determined from the prior patterns data set, a second probability $P(X_{t-k}|X_t)$ is determined from the epoch traffic pattern data set and a third probability $P(X_t)$ is determined from the state transition data set.

* * * * *